United States Patent
Chen et al.

(10) Patent No.: US 11,350,461 B2
(45) Date of Patent: May 31, 2022

(54) METHOD OF CONFIGURING UPLINK GRANT-FREE TRANSMISSION AND DEVICE THEREOF

(71) Applicant: VIVO MOBILE COMMUNICATION CO., LTD., Guangdong (CN)

(72) Inventors: Xiaohang Chen, Guangdong (CN); Xiaodong Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 153 days.

(21) Appl. No.: 16/623,301

(22) PCT Filed: Jun. 15, 2018

(86) PCT No.: PCT/CN2018/091533
§ 371 (c)(1),
(2) Date: Dec. 16, 2019

(87) PCT Pub. No.: WO2018/228540
PCT Pub. Date: Dec. 20, 2018

(65) Prior Publication Data
US 2020/0178304 A1    Jun. 4, 2020

(30) Foreign Application Priority Data
Jun. 16, 2017    (CN) .......................... 201710459619.2

(51) Int. Cl.
*H04W 4/00*        (2018.01)
*H04W 74/08*       (2009.01)
(Continued)

(52) U.S. Cl.
CPC ....... *H04W 74/0833* (2013.01); *H04L 1/1642* (2013.01); *H04L 1/1819* (2013.01);
(Continued)

(58) Field of Classification Search
CPC .............. H04W 74/0833; H04W 76/27; H04L 1/1642; H04L 1/1819
See application file for complete search history.

(56) References Cited

U.S. PATENT DOCUMENTS

| | | |
|---|---|---|
| 2014/0254544 A1 | 9/2014 | Kar Kin Au et al. |
| 2016/0338107 A1 | 11/2016 | Zeng et al. |

(Continued)

FOREIGN PATENT DOCUMENTS

| | | |
|---|---|---|
| CN | 106507486 A | 3/2017 |
| CN | 106507497 A | 3/2017 |

(Continued)

OTHER PUBLICATIONS

International Preliminary Report on Patentability and Translation of International Preliminary Report on Patentability, dated Dec. 17, 2019, for PCT/CN2018/091533, International filing date of Jun. 15, 2018, consisting of 4 Pages.

(Continued)

*Primary Examiner* — Siren Wei
(74) *Attorney, Agent, or Firm* — Brooks Kushman P.C.

(57) ABSTRACT

A method of configuring an uplink grant-free transmission and a device thereof are provided. The method includes: acquiring a transmission location of an uplink grant-free transmission according to a current configuration parameter; acquiring, according to the transmission location, a corresponding subframe time slot, and initiating the uplink grant-free transmission to a network side on the subframe time slot; where the current configuration parameter includes one or more of: a starting location, a subframe internal offset and a transmission period, where the starting location includes a starting location indicated by a system frame number and a subframe number or a starting location indicated by a subframe number.

8 Claims, 2 Drawing Sheets

(51) Int. Cl.
*H04W 76/27* (2018.01)
*H04L 1/16* (2006.01)
*H04L 1/18* (2006.01)
*H04W 72/04* (2009.01)

(52) U.S. Cl.
CPC ..... *H04W 72/042* (2013.01); *H04W 72/0446* (2013.01); *H04W 76/27* (2018.02)

(56) References Cited

U.S. PATENT DOCUMENTS

| | | | |
|---|---|---|---|
| 2018/0145790 A1 | 5/2018 | Xu et al. | |
| 2018/0146495 A1 | 5/2018 | Xu et al. | |
| 2018/0199381 A1 | 7/2018 | Rong et al. | |
| 2018/0295651 A1* | 10/2018 | Cao | H04W 74/0833 |
| 2018/0317213 A1* | 11/2018 | Islam | H04L 1/1864 |
| 2019/0268924 A1* | 8/2019 | Kim | H04L 5/0078 |

FOREIGN PATENT DOCUMENTS

| | | |
|---|---|---|
| WO | 2015113252 A1 | 8/2015 |
| WO | 2016196036 A1 | 12/2016 |
| WO | 2017000145 A1 | 1/2017 |
| WO | 2017011944 A1 | 1/2017 |
| WO | 2017041683 A1 | 3/2017 |
| WO | 2017098442 A1 | 6/2017 |
| WO | 2018228540 A1 | 12/2018 |

OTHER PUBLICATIONS

Translation of Written Opinion, dated Oct. 2, 2019, for PCT/CN2018/091533, International filing date of Jun. 15, 2018, consisting of 4 Pages.
Translation of International Search Report, dated Dec. 20, 2018, for PCT/CN2018/091533, International filing date of Jun. 15, 2018, consisting of 3 Pages.
International Search Report, dated Dec. 20, 2018, for PCT/CN2018/091533, International filing date of Jun. 15, 2018, consisting of 4 Pages.
Written Opinion, dated Dec. 20, 2018, for PCT/CN2018/091533, International filing date of Jun. 15, 2018, consisting of 3 Pages.
Hisilicon Huawei, "Grant-free transmission for UL URLLC," 3GPP TSG RAN WG1, Meeting #89, May 15-19, 2017, Hangzhou, China, consisting of 7 Pages.
Extended European Search Report, dated May 12, 2020, for CN 201710459619.2, Priority date of Jun. 16, 2017, consisting of 8 Pages.
First Office Action, dated Dec. 25, 2019, for CN 201710459619.2, Priority date of Jun. 16, 2017, consisting of 7 Pages.
Translation of First Office Action, dated Dec. 25, 2019, for CN 201710459619.2, Priority date of Jun. 16, 2017, consisting of 7 Pages.
Lenovo, "HARQ design for UL grant-free URLLC transmission," 3GPP TSG RAN WG1, NR Ad-Hoc Meeting, Jan. 16-20, 2017, Spokane, Washington, USA, consisting of 3 Pages.

* cited by examiner

METHOD OF CONFIGURING UPLINK GRANT-FREE TRANSMISSION AND DEVICE THEREOF

CROSS REFERENCE OF RELATED APPLICATION

The present application is the U.S. national phase of PCT Application PCT/CN2018/091533 filed on Jun. 15, 2018, which claims a priority of Chinese patent application No. 201710459619.2 filed on Jun. 16, 2017, which is incorporated herein by reference in its entirety.

TECHNICAL FIELD

The present disclosure relates to the field of communication technologies, and in particular, to a method of configuring an uplink grant-free transmission and a device thereof.

BACKGROUND

3GPP, the global 5G standard-setting body, initiated a 5G new air interface research project, hopes to develop a new 5G wireless air interface standard based on OFDM, and 5G New Radio (NR) is brought correspondingly. 5G NR is a global 5G standard with a brand new air interface design based on OFDM and is a very important cellular mobile technology base for the next generation.

Compared with the mobile communication systems in the related art, the future 5G mobile communication systems need to adapt to more diversified scenarios and business requirements. The main scenarios of the NR system include the mobile broadband enhanced eMBB, the large-scale Internet of Things mMTC and ultra-reliable ultra-low latency communication URLLC. These scenarios need a system with high reliability, low latency, large bandwidth and wide coverage. For such scenarios, low latency and highly reliable transmission are required. For such service requirements, the NR system supports the grant-free transmission, so as to reduce the signaling interaction process and meeting low latency requirements.

At present, in the NR system, the uplink grant-free (UL grant-free) transmission may adopt a configuration framework similar to the UL semi-persistent scheduling (SPS), that is, an equally spaced semi-static resource configuration. The NR system is further provided with a more flexible numerology configuration or scheduling granularity configuration, so as to meet the requirements of new services. However, if only the LTE-based UL SPS framework is used, the grant-free transmission is not applicable to different numerology configurations and shorter scheduling time granularity (such as granularity in mini-slot or symbol level).

To solve this issue, the LTE system introduces shorter TTI (sTTI) and shorten processing time (sPT) for low-latency services, which can support the transmission with shorter scheduling time granularity to configure the transmission. Specifically, in the LTE-based numerology, a plurality of shorter TTIs is configured in the normal TTI of the LTE, and the shorter TTI is referred to as sTTI. The normal TTI of the LTE is 1 millisecond in the time domain. The sTTI uses the same subcarrier spacing as LTE in the frequency domain.

However, the NR system may use both the LTE-based numerology configuration and the higher subcarrier spacing so as to obtain a shorter TTI length, the method of configuring the UL grant-free based on the sTTI still cannot support the flexible Numerology configuration in the NR system.

SUMMARY

A method of configuring an uplink grant-free transmission and a device thereof are provided in the present disclosure.

In a first aspect, a method of configuring an uplink grant-free transmission is provided in the embodiments of the present disclosure, including:

acquiring a transmission location of an uplink grant-free transmission according to a current configuration parameter;

acquiring, according to the transmission location, a corresponding subframe time slot, and initiating the uplink grant-free transmission to a network side on the subframe time slot;

where the current configuration parameter includes one or more of:

a starting location, a subframe internal offset and a transmission period, where the starting location includes a starting location indicated by a system frame number and a subframe number or a starting location indicated by a subframe number.

In a second aspect, a method of configuring an uplink grant-free transmission is provided in the embodiments of the present disclosure, including:

indicating to a terminal device a configuration parameter for an uplink grant-free transmission;

where the configuration parameter includes one or more of:

a starting location, a subframe internal offset and a transmission period, where the starting location includes a starting location indicated by a system frame number and a subframe number or a starting location indicated by a subframe number.

In a third aspect, a terminal device is provided in the embodiments of the present disclosure, including: a transmission location module and a transmission module;

the location acquisition module is configured to acquire a transmission location of an uplink grant-free transmission according to a current configuration parameter; and the transmission module is configured to acquire, according to the transmission location, a corresponding subframe time slot, and initiate the uplink grant-free transmission to a network side on the subframe time slot;

where the current configuration parameter includes one or more of:

a starting location, a subframe internal offset and a transmission period, where the starting location includes a starting location indicated by a system frame number and a subframe number or a starting location indicated by a subframe number.

In a fourth aspect, an network device is provided in the embodiments of the present disclosure, including: an indication module, where the indication module is configured to indicate to a terminal device a configuration parameter for an uplink grant-free transmission;

where the configuration parameter includes one or more of:

a starting location, a subframe internal offset and a transmission period, where the starting location includes a starting location indicated by a system frame number and a subframe number or a starting location indicated by a subframe number.

In a fifth aspect, a system is provided in the embodiments of the present disclosure, including: the terminal device according to the third aspect or all the above terminal device and the network device according to the fourth aspect or all the above network device.

In a sixth aspect, a terminal device is provided in the embodiments of the present disclosure, including:

at least one processor; and at least one memory coupled to the processor to communicate with the processor, where the memory stores program instructions executable by the processor, the processor calls the program instructions to perform the method according to the first aspect or any one of the embodiments of the first aspect.

In a seventh aspect, a non-transitory computer-readable storage medium is provided in the embodiments of the present disclosure, where the non-transitory computer-readable storage medium stores computer instructions, the computer instructions enable the computer to perform the method according to the first aspect or any one of the embodiments of the first aspect.

In an eighth aspect, a network device is provided in the embodiments of the present disclosure, including:

at least one processor; and at least one memory coupled to the processor to communicate with the processor, where the memory stores program instructions executable by the processor, the processor calls the program instructions to perform the method according to the second aspect or any one of the embodiments of the second aspect.

In a ninth aspect, a non-transitory computer-readable storage medium is provided in the embodiments of the present disclosure, where the non-transitory computer-readable storage medium stores computer instructions, the computer instructions enable the computer to perform the method according to the second aspect or any one of the embodiments of the second aspect.

DETAILED DESCRIPTION

Figure 1:
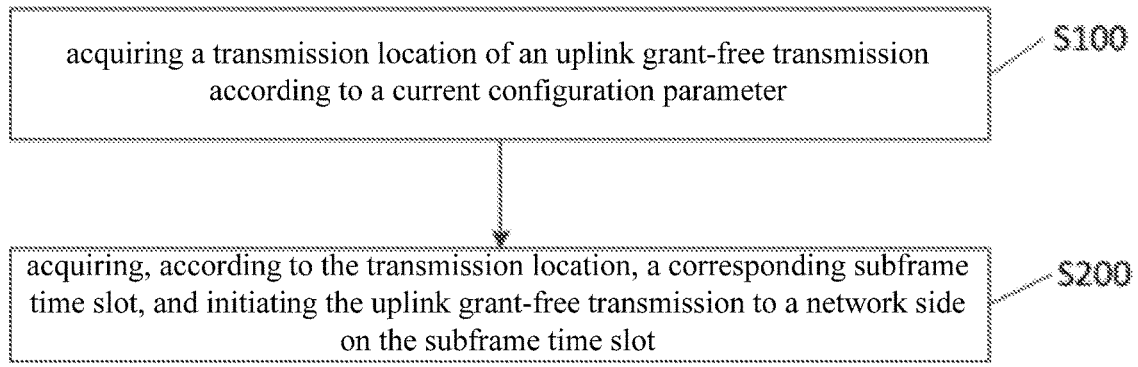
FIG. 1 is a flowchart of a method of configuring an uplink grant-free transmission at a terminal side in the embodiments of the present disclosure.

In order to make the object, technical solution and advantages of the present disclosure more clearly, the present disclosure will be further described in detail below with reference to the drawings and embodiments. It should be understood that the embodiments described herein are merely illustrative and are not intended to limit the disclosure.

The terms "component," "module," "system," and the like, as used in this specification, are used to mean a computer-related entity, hardware, firmware, a combination of hardware and software, software, or software in execution. For example, a component can be, but is not limited to be a process running on a processor, a processor, an object, an executable, a thread of execution, a program, and/or a computer. Both the application running on the computing device and the computing device can be components. One or more components can reside within a process and/or execution thread, and the components can be located on one computer and/or distributed between two or more computers. A component may pass according to a signal having one or more data packets (e.g., data from two components interacting with another component between the local system, the distributed system, and/or the network, such as the Internet interacting with other systems) Local and/or remote processes to communicate.

The terms used in this specification, such as system frames, subframes, time slots, symbols, etc., are often replaced in the field by system frame, subframe, time slot, symbol, etc., and Chinese and English terms have the same meaning.

It should be understood that the technical solutions of the embodiments of the present disclosure can be applied to various communication systems, for example, Global System of Mobile Communication (GSM) system, Code Division Multiple Access (CDMA) system, Wideband Code Division Multiple Access (WCDMA) General Packet Radio Service (GPRS) system, Long Term Evolution (LTE) System, LTE Frequency Division Duplex (FDD) system, LTE Time Division Duplex (TDD), Universal Mobile Telecommunication System (UMTS), global Worldwide Interoperability for Microwave Access (WiMAX) communication system, and future 5G communication systems.

It should be understood that the technical solution of the embodiments of the present disclosure may also be applied to various communication systems based on non-orthogonal multiple access technologies, such as a Sparse Code Multiple Access (SCMA) system. Of course, SCMA can also be called other names in the field of communication. Further, the technical solution of the embodiment of the present disclosure can be applied to a multi-carrier transmission system using a non-orthogonal multiple access technology, for example, using Orthogonal Frequency Division Multiplexing (OFDM), Filter Bank Multi-Carrier (FBMC), Generalized Frequency Division Multiplexing (GFDM), Filtered Orthogonal Frequency Division Multiplexing (OFDM) (Filtered-OFDM, short as F-OFDM) system or the like.

The present disclosure describes various embodiments in connection with a terminal device. The terminal device can communicate with one or more core networks via a radio access network (RAN), and the terminal device can be referred to as a User Equipment (UE), an access terminal, a subscriber unit, a subscriber station, Mobile station, mobile station, remote station, remote terminal, mobile device, user terminal, terminal, wireless communication device, user agent or user device. The access terminal may be a cellular phone, a cordless phone, a Session Initiation Protocol (SIP) phone, a Wireless Local Loop (WLL) station, and a Personal Digital Assistant (PDA), a handheld device with wireless communication capabilities, a computing device or other processing device connected to a wireless modem, an in-vehicle device, a wearable device, a terminal device in a future 5G network, and the like.

The present disclosure describes various embodiments in connection with a network device. The network device may be a device for communicating with the terminal device, for example, may be a base station (Base Transceiver Station, abbreviated as "BTS") in the GSM system or CDMA, or may be a base station in the WCDMA system (NodeB, abbreviated as "NB"), or may also be an Evolutional Node B (eNB or eNodeB) in the LTE system, or the network device may be a relay station, an access point, an in-vehicle device, a wearable device, and a network side device in a future 5G network or a network device in a future evolved PLMN network.

It should be understood that the uplink grant-free transmission in the embodiments of the present disclosure includes at least the following situations:

(1) The network device pre-allocates and informs the terminal device of multiple grant-free transmission resources; when the terminal device has an uplink data transmission requirement, the terminal device may select at least one grant-free transmission resource from the plurality of grant-free transmission resources pre-allocated by the network device, and use the selected transmission resource to send the uplink data.

(2) The terminal device performs the uplink grant-free data transmission without the grant of the network device. In contrast, the grant of the network device may refer to: after receiving an uplink scheduling request sent by a terminal device, the network device sends an uplink grant to the terminal device, where the uplink grant indicates the uplink transmission resource allocated to the terminal device.

(3) A competitive transmission mode, which refers to that a plurality of terminals simultaneously perform uplink grant-free data transmission on the same time-frequency resources allocated in advance without the grant of the base station.

When uplink grant-free transmission is performed in the NR system, since the NR system can adopt both the LTE-based numerology and the higher sub-carrier interval to obtain a shorter TTI length, the method of configuring the UL grant-free based on the sTTI in the related art still cannot support the flexible Numerology configuration in the NR system.

Of course, in order to support different numerology configurations or a plurality of scheduling time granularity configurations for new types of services of the NR system, more UL grant-free transmission resources may also be configured, so as to reduce the probability of transmission collisions. However, this method may occupy a lot of resources, which will result in a decrease in resource utilization.

To ensure that the UL grant-free transmission is applicable for different Numerologies and/or time granularities, an UL grant-free resource configuration method based on different Numerologies and/or time granularities is provided in the embodiments of the present disclosure.

It should be noted that the reference numerals S100, S200, and S300 in the embodiments of the present disclosure are only to identify the processing steps, and do not limit the sequence of the steps with these numbers. Specifically, S100 and S200 are the steps at the terminal side, Step 300 is the step at the network side, and the S100 and S200 at the terminal side do not mean a consequent sequence.

The present disclosure will be described in detail below in conjunction with the embodiments.

FIG. 1 is a flowchart of a method of configuring an uplink grant-free transmission at a terminal side in the embodiments of the present disclosure. As shown in FIG. 1, the method of configuring an uplink grant-free transmission includes:

S100: acquiring a transmission location of an uplink grant-free transmission according to a current configuration parameter;

S200: acquiring, according to the transmission location, a corresponding subframe time slot, and initiating the uplink grant-free transmission to a network side on the subframe time slot;

the current configuration parameter includes one or more of:

a starting location, a subframe internal offset and a transmission period, where the starting location includes a starting location indicated by a system frame number and a subframe number or a starting location indicated by a subframe number.

The method of configuring an uplink grant-free transmission is applied to the terminal side, and the execution entity is the terminal device.

Optionally, the configuration parameters in the embodiments of the present disclosure include:

the starting location, refers to a starting time indicated by a starting time of a system frame and a starting time of a subframe or a starting time indicated by a starting time of a subframe; or a numerology location indicated by a starting numerology parameter of a system frame and a starting numerology parameter of a subframe or a numerology location identity indicated by a starting numerology parameter indicated by a subframe. Specifically, in the case that the starting location is indicated by the starting time of the system frame and/or the starting time of the subframe, the starting location represents a starting time location; in the case that the starting location is indicated by the starting numerology parameter of the system frame and/or the starting numerology parameter of the subframe, the starting location represents the starting numerology parameter location.

The subframe internal offset refers to an offset in units of time in the subframe, or a numerology offset in units of a quantity of time slots or a quantity of symbols in the subframe.

The transmission period refers to a transmission period in units of time, or a transmission period in units of a quantity of subframes or a quantity of time slots or a quantity of symbols.

Take the LTE system as an example. In an LTE system, the symbols refer to OFDM symbols. The maximum system frame number is 1024, that is, the system frame number range is from 0 to 1023, and the system frames exceeding the 1023 number are numbered from 0 again. The quantity of subframes in each system frame is 10, that is, each system frame includes 10 subframes. Each subframe includes 2 time slots, and each time slot includes 7 OFDM symbols. Of course, in the NR system or other systems, the sub-carrier bandwidth is different, so the configuration of the subframe and the quantity of time slots in the subframe and the like may be different, which is not limited in the embodiments of the present disclosure.

The current configuration parameters in the S100 may be acquired by the terminal device according to the current running parameter of the terminal device, or may be acquired according to the instruction of the network side; or some of the current configuration parameters may be acquired according to the current running parameter of the terminal device, and the other current configuration parameters may be acquired according to the instruction of the network side.

First, the S100 of acquiring the transmission location of the uplink grant-free transmission according to the current configuration parameter includes: acquiring a transmission location of each grant-free data in the uplink grant-free transmission based on the starting location, the subframe internal offset, the transmission period and the like in the configuration parameter.

The transmission location in the embodiments of the present disclosure refers to a time location or a numerology parameter location. As described above, in the case that the calculation is based on the starting time of the system frame and/or subframe, the time offset of subframe internal offset and the transmission time period in units of time, the time location of the grant-free data is acquired. In the case that the calculation is based on the starting numerology parameter of the system frame and/or the starting numerology parameter of the subframe, the numerology offset in units of the quantity of time slots or the quantity of symbols of the subframe internal offset and the transmission period in units of the quantity of subframes or the quantity of time slots or the quantity of symbols, the numerology parameter location of the grant-free data is acquired.

Secondly, the S200 of acquiring, according to the transmission location, the corresponding subframe time slot includes: acquiring, according to the time location acquired in S100 and based on the time-frequency resource configuration of the system frame, the subframe and the time slot, a time slot on the subframe corresponding to the time location. Further, when the system configures a shorter sTTI, such as a mini-slot, etc., within a shorter time granularity, the corresponding mini-slot location may be acquired based on the time location; or The time slot or mini-slot on the subframe corresponding to the numerology parameter location is acquired based on the numerology parameter location acquired in S100.

Finally, after determining the subframe time slot of the transmission, the uplink grant-free transmission is initiated to the network side on the subframe time slot such as slot or a mini-slot.

According to the embodiments of the present disclosure, the transmission location of the uplink grant-free transmission is acquired based on the starting location, subframe internal offset and the transmission period in the configuration parameter, it is able to flexibly adapt to different Numerologies or different time granularities of the system in the related art, support the configuration of different Numerologies and/or the shorter scheduling time granularity in the NR system, thereby solving the technical issues in the related art.

It should be noted that the current configuration parameter in the embodiments of the present disclosure refers to the current configuration parameter of the terminal device. When the terminal device performs the uplink grant-free transmission based on the current configuration parameter, if the new configuration parameter indicated by the network side is received by the terminal, the terminal device may perform Step S100 to take the new configuration parameter as the current configuration parameter, to reacquire the transmission location of the uplink grant-free transmission, so that S100 and S200 may be alternately performed during the communication.

In an optional embodiment, the current configuration parameter includes a default configuration parameter and/or a configuration parameter indicated by the network side.

It should be understood that the configuration parameters used by the terminal device to acquire the transmission location of the uplink grant-free transmission include any of the following situations:

(1) Using the default configuration parameters only. The default configuration parameter refers to a configuration parameter that the terminal device may determine according to its own operating parameters, or a preset default configuration parameter, or taking a parameter estimated according to the received downlink signaling as a default configuration parameter. The default configuration parameter includes:

when the network side configures the uplink grant-free for the terminal device through the RRC, the terminal device takes the system frame number and the subframe number of the received RRC signaling as the default starting location parameter, or use the $n_{th}$ subframe of the received RRC signaling as the default sub frame number; or the terminal device takes the quantity of time slots or the quantity of symbols corresponding to the time-frequency resource location of the received PDCCH signaling as the default subframe internal offset parameter, or directly sets the subframe internal offset to 0; or the terminal device takes the time interval of the transmission period of the current operation as the default transmission period parameter.

The above are only some of the default configuration parameters. The actual option method may have more situations, which may be determined according to specific conditions, and the embodiment of the present disclosure is not limited herein.

(2) Using only the configuration parameters indicated by the network side. The configuration parameters indicated by the network side include:

the network side explicitly indicates, to the terminal device, all the parameters that can be included in the configuration parameter through a RRC signaling; or the network side explicitly indicates all parameters to the terminal device through a PDCCH signaling; or the network side explicitly indicates one part of parameters to the terminal device through a RRC signaling and explicitly indicates the other part of the parameters to the terminal device through a PDCCH signaling; or the network side explicitly indicates one part of parameters to the terminal device through a RRC signaling and implicitly indicates the other part of the parameters to the terminal device through a PDCCH signaling; or the network side implicitly indicates one part of parameters to the terminal device through a RRC signaling and explicitly indicates the other part of the parameters to the terminal device through a PDCCH signaling; or the network side implicitly indicates all parameters to the terminal device through a PDCCH signaling.

In the above cases, regardless of implicitly or explicitly indicating through the RRC signaling or the PDCCH signaling, the configuration parameters for the terminal device to acquire the transmission location all come from the indication of the network side.

In some cases, the configuration parameters explicitly indicated or implicitly indicated by the network side may be the same as the corresponding parameters estimated by the terminal device according to the received downlink signaling.

(3) the configuration parameters includes the default configuration parameters and the configuration parameters indicated by the network side.

As described in the foregoing case (2), when the network side indicates a part of parameters to the terminal device through the RRC or the PDCCH, some default parameters may be selected according to the method described in the foregoing case (1), and thus the default configuration parameters may include one or more kinds of parameters of the configuration parameters, the configuration parameter indicated by the network may also include one or more kinds of parameters of the configuration parameter.

According to the embodiments of the present disclosure, it is able to flexibly select configuration parameters by the above method. The way how the network side indicates the configuration parameter to the terminal device through the RRC signaling or the PDCCH signaling may depend on the rules agreed by the two parties, and the signaling may be encapsulated and decoded according to the agreed rules, which is not limited herein.

In an optional embodiment, S100 of acquiring the transmission location of the uplink grant-free transmission includes:

acquiring a transmission location $T_N$ of an $N_{th}$ uplink grant-free transmission through the following calculation formula:

$$T_N = \text{(the starting location+the subframe internal offset+the transmission period}*N) \bmod \text{a system maximum configuration number,}$$

where in the case that the starting location is indicated by the system frame number and the subframe number, the system maximum configuration number=a maximum system frame number*a quantity of subframes in each system frame; in the case that the starting location is indicated by the subframe number, the system maximum configuration number=a quantity of subframes in each system frame.

The S100 of acquiring the transmission location of the uplink grant-free transmission based on the current configuration parameter is described in the embodiment of the present disclosure. For the calculation of the transmission location $T_N$ of the $N_{th}$ uplink grant-free transmission, the value of N is 0, 1, 2, 3, etc., and so on, depending on the requirements of the data transmission. By the above calculation formula, it is able to calculate each transmission time and transmission location from the first time of transmission to the last time of transmission of the uplink grant-free transmission, and the uplink grant-free data may be sent in sequence at the determined transmission time or transmission location. The "mod" in the above calculation formula represents a Modulo operation which is for not exceeding the maximum system frame number.

The starting location in the calculation formula of the embodiment of the present disclosure may refer to the related description of the foregoing embodiment, and the details thereof are omitted herein.

The subframe internal offset in the above calculation formula includes an offset in units of time, or an offset in units of a quantity of time slots or a quantity of symbols.

As described hereinabove, the subframe internal offset includes: a time offset and a numerology offset, wherein the offset N_start_offset in units of the quantity of time slots or the quantity of symbols includes: the offset in units of the quantity of time slots or the offset in units of symbols. Since one subframe contains several time slots, and one time slot contains several symbols (for example, the symbols in the NR system are OFDM symbols), the granularities of the above two offsets are different, and the specific granularity is selected according to the actual situation of the communication system, which is not limited herein.

The transmission period in the calculation formula includes a transmission period in units of time or a transmission period in units of a quantity of subframes or a quantity of time slots or a quantity of symbols.

As described in the foregoing embodiment, the transmission period also includes: a transmission period represented by time and a transmission period represented by a numerical value, wherein the transmission period in units of quantity number of subframes or the quantity of time slots or the quantity of symbols includes: a transmission period in units of subframes, a transmission period in units of time slots, and a transmission period in units of symbols, and their period granularities are decrease in sequence. The specific granularity is specifically determined according to the actual situation of the communication system, which is not limited herein.

In a future communication system, if a numerology parameter having a smaller granularity than a symbol is included, it is only necessary to expand on the basis of the embodiment of the present disclosure without inventive work and is therefore included in the scope of the embodiment of the present disclosure.

The time offset, the numerology offset, the transmission period represented by time, and the transmission period represented by the numerical values in the embodiments of the present disclosure need to cooperate with each other in specific use.

In an optional embodiment, when the subframe internal offset is the offset T_start_offset in units of time, the transmission period may be the transmission period T_interval in units of time, so as to acquire the uplink grant-free transmission time;

When the subframe internal offset is the offset N_start_offset in units of the quantity of time slots or the quantity of symbols, the transmission period is the transmission period N_interval in units of the quantity of subframes or the quantity of time slots or the quantity of symbols, so as to obtain the transmission location of the uplink grant-free transmission, where the transmission location is the location of the subframe time slot.

The calculation formula described in the embodiment of the present disclosure is described below in conjunction with different Numerologies and scheduling time granularity parameters.

In an optional embodiment, the calculation formula is a first calculation formula based on the system frame number, the subframe number, an offset T_start_offset in units of time and a transmission period T_interval in units of time, and the first calculation formula is:

$$T_N = ((\text{subframe\_per\_SFN}*T\_SFN\_\text{start}+T\_\text{subframe\_start})+T\_\text{start\_offset}+N*T\_\text{interval}) \bmod \text{max\_SFN}*\text{subframe\_per\_SFN,}$$

where $T_N$ is the transmission time of the uplink grant-free transmission, and T_SFN_start is the system frame starting time, T_subframe_start is a subframe starting time, max_SFN is the maximum system frame number, and subframe_per_SFN is the quantity of subframes in each system frame.

In the embodiment of the present disclosure, the terminal device acquires the transmission time of the uplink grant-free transmission by using the first calculation formula based on the system frame number, the subframe number, the offset T_start_offset in units of time and the transmission period T_interval in units of time units in the current configuration parameter. Since the system frame number and the subframe number are configured at the same time, the base of the modulo operation in the first calculation formula in the embodiment of the present disclosure is the maximum system frame number*the quantity of subframes in each system frame.

Specifically, in the 5G NR system, max_SFN=1024, subframe_per_SFN=10, then the first calculation formula can be expressed as:

$$T_N=((10*T\_SFN\_start-T\_subframe\_start)+T\_start\_offset+N*T\_interval) \bmod 10240.$$

Figure 2:
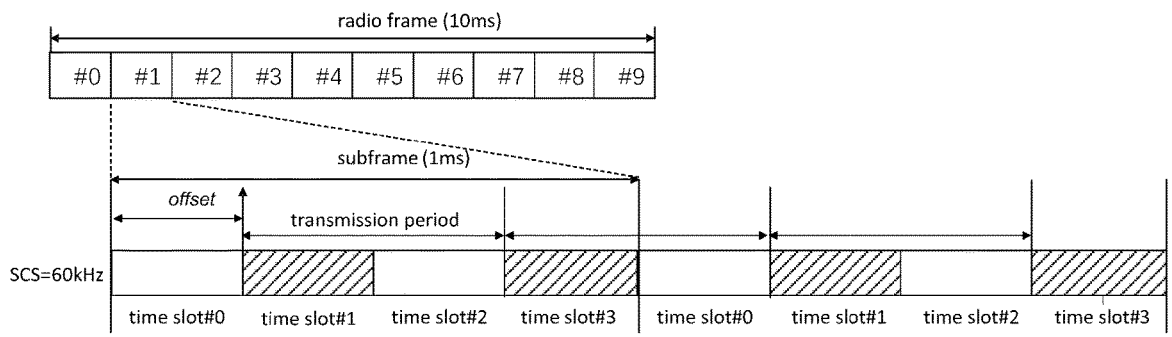
FIG. 2 is a schematic diagram of subframes with a 60 kHz subcarrier spacing in the embodiments of the present disclosure.

FIG. 2 is a schematic diagram of a subframe in a 60 kHz subcarrier spacing in the embodiments of the present disclosure. In the embodiments shown in FIG. 2, when the subcarrier spacing is 60 kHz, a length of each subframe is 1 millisecond (ms), and a length of each time slot is 0.25 ms, which is equivalent to that each subframe contains four 60 kHz time slots. Given T_start_offset=0.25, the offset from the starting location of the subframe by 0.25 ms. Given T_interval=0.5, the transmission period inside the subframe is 0.5 ms. Given T_SFN_start=0, T_subframe_start=1, then the first calculation formula can be expressed as:

$$T_N=((10*0+1)+0.25+N*0.5) \bmod 10240=1+0.25+N*0.5.$$

When N=0, $T_N$=1.25, corresponding to time slot #1 of subframe #1 in FIG. 2;
When N=1, $T_N$=1.75, corresponding to time slot #3 of subframe #1 in FIG. 2;
When N=2, $T_N$=2.25, corresponding to time slot #1 of subframe #2 in FIG. 2;
The rest can be done in the same manner, and the description thereof is omitted herein.

In an optional embodiment, the calculation formula is a second calculation formula based on the subframe number, an offset T_start_offset in units of time and a transmission period T_interval in units of time, and the second calculation formula is:

$$T_N=(T\_subframe\_start+T\_start\_offset+N*T\_interval) \bmod subframe\_per\_SFN,$$

where $T_N$ is the transmission time of the uplink grant-free transmission, T_subframe_start is the subframe starting time, and subframe_per_SFN is the quantity of subframes in each system frame.

Compared with the previous embodiment, the starting location of the configuration parameter of the terminal device is indicated by the subframe number, and is still the time offset and the transmission period in units of time, and the base of the modulo operation is the quantity of subframes in each system.

Specifically, in the 5G NR system, if subframe_per_SFN=10, the second calculation formula can be expressed as:

$$T_N=(T\_subframe\_start+T\_start\_offset+N*T\_interval) \bmod 10;$$

The transmission time obtained by the second calculation formula is an offset time relative to the current system frame. When N takes a different value, if the calculated time exceeds the range of 10 subframes, the excessed time is the time of the subframe of the next system frame, and so on; the calculation method is the same as that of the previous embodiment, and the examples are not repeated here.

In an optional embodiment, the calculation formula is a third calculation formula or a fourth calculation formula based on the system frame number, the subframe number, an offset N_start_offset in units of the quantity of time slots or the quantity of symbols and a transmission period N_interval in units of the quantity of subframes or the quantity of time slots or the quantity of symbols;

the third calculation formula is:

$$T_N=N\_slot\_symbol\_per\_subframe* \\ (((subframe\_per\_SFN*N\_SFN\_start+N\_subframe\_start)+N\_start\_offset/N\_slot\_symbol\_per\_subframe+N*N\_interval) \bmod \\ max\_SFN*subframe\_per\_SFN);$$

The applicable range of the third calculation formula is: the transmission period N_interval is in units of subframes, and the transmission period is greater than or equal to 1 subframe, for example, the transmission period is 1 subframe, 2 subframes, or 3 subframes, etc., which are not listed one by one.

the fourth calculation formula is:

$$T_N=N\_slot\_symbol\_per\_subframe* \\ (((subframe\_per\_SFN*N\_SFN\_start+N\_subframe\_start)+(N\_start\_offset+N*N\_interval)/ \\ N\_slot\_symbol\_per\_subframe) \bmod \\ max\_SFN*subframe\_per\_SFN);$$

The applicable range of the fourth calculation formula is: the transmission period N_interval is in units of time slots or symbols, and the transmission period is less than 1 subframe, for example, the transmission period is 1 time slot, 2 time slots, 3 time slots, 1 symbol, 2 symbols or 3 symbols, etc., which are not listed one by one.

where $T_N$ is the transmission location of the uplink grant-free transmission, N_SFN_start is a system frame starting location, N_subframe_start is a subframe starting location, max_SFN is the maximum system frame number, subframe_per_SFN is the quantity of subframes in each system frame, and N_slot_symbol_per_subframe is the quantity of time slots or the quantity of symbols in each subframe.

In the embodiment of the present disclosure, based on the system frame number, the subframe number, the offset number N_start_offset in units of the quantity of time slots or the quantity of symbols and the transmission period N_interval in units of the quantity of subframes or in units of the quantity of time slots or symbols of the current configuration parameter, the terminal device acquires the transmission time of the uplink grant-free transmission by using the third calculation formula or the fourth calculation formula. The base of the modulo operation in the third calculation formula or the fourth calculation formula in the embodiment of the present disclosure is the maximum system frame number*the quantity of subframes in each system frame.

Specifically, in the 5G NR system, max_SFN=1024, subframe_per_SFN=10, the third calculation formula can be expressed as:

$$T_N=N\_slot\_symbol\_per\_subframe*(((10*N\_SFN\_start+N\_subframe\_start)+N\_start\_offset/N\_slot\_symbol\_per\_subframe-N*N\_interval) \bmod \\ 10240);$$

The fourth calculation formula can be expressed as:

$$T_N=N\_slot\_symbol\_per\_subframe*(((10*N\_SFN\_start|N\_subframe\_start)+(N\_start\_offset-N*N\_interval)/N\_slot\_symbol\_per\_subframe) \\ \bmod 10240);$$

Figure 3:
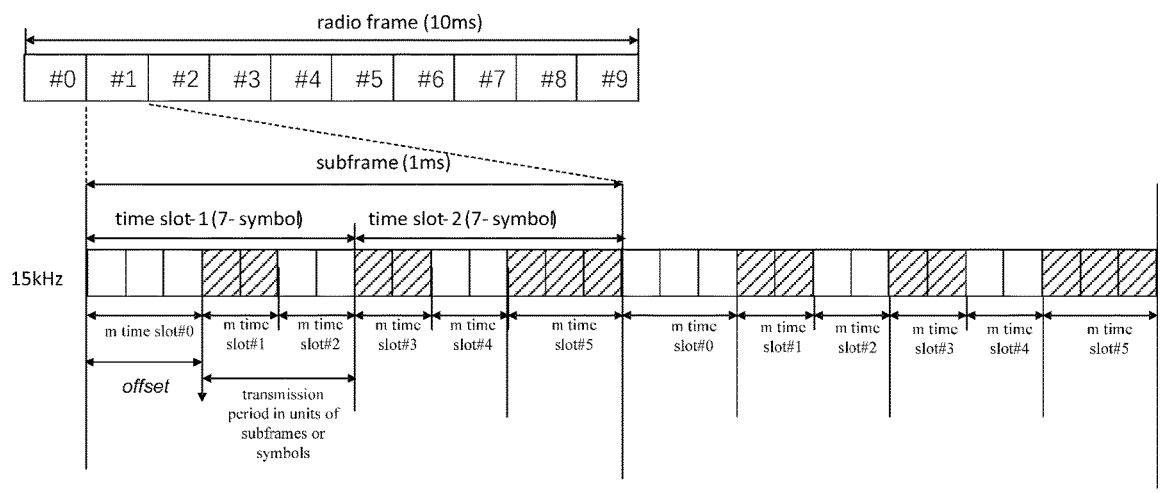
FIG. 3 is a schematic diagram of subframes with a 15 kHz subcarrier spacing in the embodiments of the present disclosure.

FIG. 3 is a schematic view of a subframe in a 15 kHz subcarrier spacing in the embodiments of the present disclosure. In the embodiment shown in FIG. 3, when the subcarrier spacing is 15 kHz, each time slot contains 7 OFDM symbols, and each subframe contains 2 time slots. Using mini-slot (mSlot) time granularity, within 1 subframe, mini-slot #1, mini-slot #2, mini-slot #3 and mini-slot #4 each has a symbol length of 2 OFDM symbols, mini-slot #0 and mini-slot #5 are 3 OFDM symbols. The number of mini-slots contained in each subframe is 6. Given N_SFN_start=0, N_subframe_start=1, N_start_offset=1, that is, offset from the starting location of the subframe is 1 mSlot; N_interval=2, that is, the transmission interval inside the subframe is 2 mSlots.

Since the transmission period N_interval in the above example is less than 1 subframe, the fourth calculation formula is applied, in which case the fourth calculation formula can be expressed as:

$$T_N=6*(((10*0+1)+(1+N*2)/6) \bmod 10240)=7+N*2;$$

When N=0, $T_N$=7, corresponding to the mini-slot #1 of subframe #1 in FIG. 3;
When N=1, $T_N$=9, corresponding to mini-slot #3 of subframe #1 in FIG. 3;
When N=2, $T_N$=11, corresponding to mini-slot #5 of subframe #1 in FIG. 3;
The rest can be done in the same manner, and the description thereof is omitted herein.

In an optional embodiment, the calculation formula is a fifth calculation formula or a sixth calculation formula based on the subframe number, an offset N_start_offset in units of the quantity of time slots or the quantity of symbols and a transmission period N_interval in units of the quantity of subframes or the quantity of time slots or the quantity of symbols;

The fifth calculation formula is as follows:

$$T_N=N\_slot\_symbol\_per\_subframe*((N\_subframe\_start+N\_start\_offset/N\_slot\_symbol\_per\_subframe+N*N\_interval) \bmod subframe\_per\_SFN);$$

The applicable range of the fifth calculation formula is: the transmission period N_interval is in units of subframes, and the transmission period is greater than or equal to 1 subframe, which is the same as the usage range of the third calculation formula.

The sixth calculation formula is as follows:

$$T_N=N\_slot\_symbol\_per\_subframe*((N\_subframe\_start+(N\_start\_offset+N*N\_interval)/N\_slot\_symbol\_per\_subframe) \bmod subframe\_per\_SFN);$$

The applicable range of the sixth calculation formula is that the transmission period N_interval is in units of time slots or symbols, and is the same as the applicable range of the fourth calculation formula;

where $T_N$ is the transmission location of the uplink grant-free transmission, N_subframe_start is a subframe starting location, max_SFN is the maximum system frame number, subframe_per_SFN is the quantity of subframes in each system frame, and N_slot_symbol_per_subframe is the quantity of time slots or the quantity of symbols in each subframe.

Compared with the previous embodiment, the starting location of the configuration parameter of the terminal device in this embodiment is indicated by the subframe number, and is still a numerical offset and a transmission period in units of values, and the base of the modulo operation is the quantity of subframes in each system frame.

Specifically, in the 5G NR system, if subframe_per_SFN=10, the fifth calculation formula can be expressed as:

$$T_N=N\_slot\_symbol\_per\_subframe*((N\_subframe\_start+N\_start\_offset/N\_slot\_symbol\_per\_subframe+N*N\_interval) \bmod 10);$$

The sixth calculation formula can be expressed as:

$$T_N=N\_slot\_symbol\_per\_subframe*((N\_subframe\_start+(N\_start\_offset+N*N\_interval)/N\_slot\_symbol\_per\_subframe) \bmod 10);$$

The transmission location acquired by the fifth calculation formula or the sixth calculation formula is an offset location with respect to the current system frame. When N takes different values, if the calculated location exceeds the range of 10 subframes, the excessed time is the location of the subframe of the next system frame, and so on; the calculation method is the same as that of the previous embodiment, and the example is not repeated here.

The embodiment of the present disclosure, the transmission time of the uplink grant-free transmission is acquired by using the first calculation formula or the second calculation formula, based on the offset T_start_offset in units of time and the transmission period T_interval in units of time, and the subframe time slots are mini-slots with different lengths, the calculated transmission time may not be aligned with the starting time of the mini-slot. The embodiment of the present disclosure provides the following methods for determining the final transmission time. It should be noted that the min-time slot in all embodiments of the present disclosure can be understood as a time granularity composed of one or more symbols, and different min-time slots may be composed of different numbers of symbols.

Figure 4:
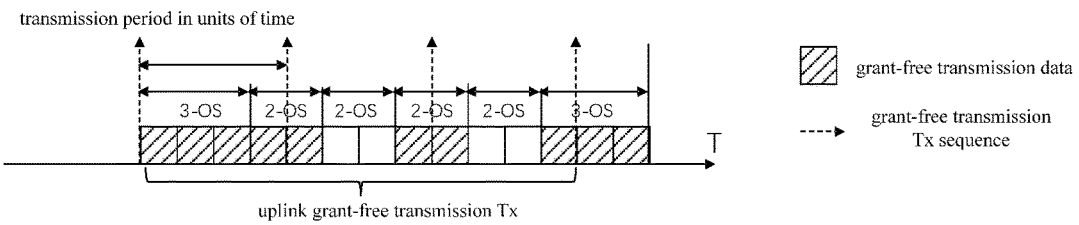
FIG. 4 is a schematic diagram of time slots and an uplink grant-free transmission time configured with mini-slots with different lengths in the first embodiments of the present disclosure.

The method for determining the final transmission time includes:

In an optional embodiment, in the case that the subframe time slot is configured through mini-slots with different lengths, the uplink grant-free transmission is initiated to the network side on the mini-slot corresponding to the transmission time determined by the calculation formula. As shown in FIG. 4, it can be further understood that the uplink grant-free data is transmitted at the starting time of the mini-slot corresponding to the transmission time determined by the calculation formula.

Figure 5:
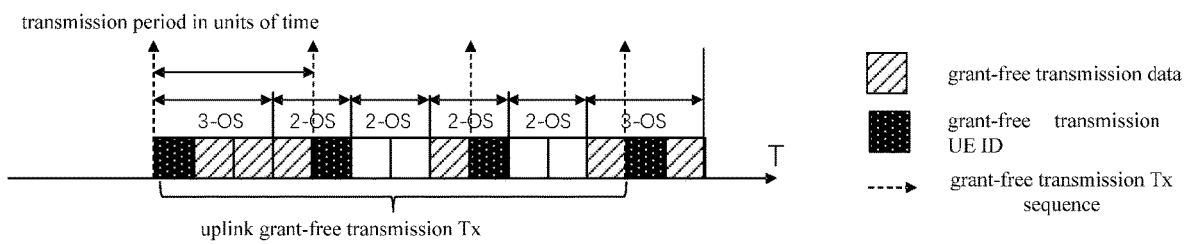
FIG. 5 is a schematic diagram of time slots and an uplink grant-free transmission time configured with mini-slots with different lengths in the second embodiments of the present disclosure.

In another optional embodiment, in the case that the subframe time slot is configured through mini-slots with different lengths, an uplink grant-free reference signal is sent to the network side at the transmission time and in the mini-slot corresponding to the transmission location determined by the calculation formula, and uplink grant-free data is sent to the network side on a remaining resource of the corresponding mini-slot. As shown in FIG. 5, it can be further understood that the uplink grant-free reference signal is sent at the calculated transmission time, and the uplink grant-free data is sent on the remaining resources on which the reference signal is transmitted of the mini-slot corresponding to the transmission time. The remaining resources include time domain and frequency domain resources.

Figure 6:
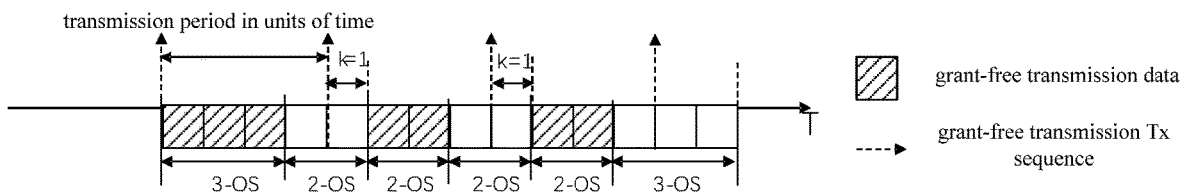
FIG. 6 is a schematic diagram of time slots and an uplink grant-free transmission time configured with mini-slots with different lengths in the third embodiments of the present disclosure.

In another optional embodiment, in the case that the subframe time slot is configured through mini-slots with different lengths, the uplink grant-free transmission is initiated to the network side on a $k_{th}$ mini-slot after the mini-slot corresponding to the transmission location determined by the calculation formula, or the uplink grant-free transmission is initiated to the network side on a $k_{th}$ symbol after a symbol of the mini-slot corresponding to the transmission time determined by the calculation formula, where k is an integer greater than or equal to 1, as shown in FIG. 6.

It can be further understood that, when k=1, the uplink grant-free data is sent at the starting time of the first mini-slot after the mini-slot corresponding to the calculated transmission time; when k=2, the uplink grant-free data is sent at the starting time of the second mini-slot after the mini-slot corresponding to the calculated transmission time, and so on. Alternatively, it can be further understood that, when k=1, the uplink grant-free data is sent at the starting time of the first symbol after the symbol in the mini-slot corresponding to the calculated transmission time; when k=2, the uplink grant-free data is sent at the starting time of the second symbol after the symbol in the mini-slot corresponding to the calculated transmission time, and so on. The reference signal in this case may be transmitted at the starting time of the mini-slot corresponding to the calculated transmission time, or may be transmitted at an appropriate time before the corresponding mini-slot, which may be implemented according to actual conditions, and the embodiment of the present disclosure is not limited herein.

It should be noted that, when the subframe time slot has mini-slots with different lengths, the calculated transmission time may not be aligned with the starting time of the mini-slot, but that will not occur when the calculation is based on the numerology parameter, that is, that will not occur when the transmission location of the uplink grant-free transmission is obtained by using the third calculation formula, the fourth calculation formula, the fifth calculation formula, or the sixth calculation formula, no misalignment occurs, because the calculation is based on the quantity of time slots or the quantity of symbols.

In an optional embodiment, S200 of the initiating the uplink grant-free transmission to the network side on the subframe time slot includes:

acquiring a HARQ process ID used in a first time of transmission of the uplink grant-free transmission, based on the transmission time determined by the calculation formula, the transmission period in units of time and a total number of HARQ processes available for the uplink grant-free transmission;

initiating the uplink grant-free transmission to the network side on the subframe time slot, through a HARQ process corresponding to the HARQ process ID The embodiments of the present disclosure provide a method for determining a HARQ process ID by using a time parameter. According to the embodiments of the present disclosure, the HARQ process ID may be associated with the time location of the transmission by using the configured information, so that the network side may determine the HARQ process ID used by the terminal device during the transmission once the network side determines that the received data is newly transmitted data, and further the network side may indicate the HARQ process ID in the uplink grant (UL grant) so as to perform a retransmission scheduling on the same data block, thereby improving the reliability of data retransmission.

In an optional embodiment, the acquiring the HARQ process ID used in the first time of transmission of the uplink grant-free transmission includes:

acquiring the HARQ process ID used in the first time of transmission of the uplink grant-free transmission by a first process calculation formula, where the first process calculation formula is:

$$\text{Proc\_ID}=(\text{floor}(T_N/T\_\text{interval}))\bmod \text{max\_proc\_num};$$

where Proc_ID is the HARQ process ID, $T_N$ is the transmission location of the uplink grant-free transmission, T_interval is the transmission period, and max_proc_num is the total number of HARQ processes available for the uplink grant-free transmission.

In the embodiment of the present disclosure, the transmission time $T_N$ is obtained by using a first calculation formula or a second calculation formula. When the terminal device obtains transmission time of the uplink grant-free transmission by using the first calculation formula or the second calculation formula according to the system frame number and/or the subframe number of the current configuration parameter, the offset T_start_offset in units of time and the transmission period T_interval in units of time, the terminal device may acquire the HARQ process ID by the first process calculation formula and use first process calculation formula by using the HARQ process corresponding to the HARQ process ID. The first process calculation formula and the subsequent "floor" are upper rounding functions.

In an optional embodiment, the initiating the uplink grant-free transmission to the network side on the subframe time slot includes:

acquiring a HARQ process ID used in a first time of transmission of the uplink grant-free transmission, based on the transmission location determined by the calculation formula, the transmission period in units of the quantity of subframes or the quantity of time slots or the quantity of symbols, the quantity of time slots or symbols in each subframe and a total number of HARQ processes available for the uplink grant-free transmission;

initiating the uplink grant-free transmission to the network side on the subframe time slot, through a HARQ process corresponding to the HARQ process ID.

The embodiments of the present disclosure provide a method for determining a HARQ process ID by using a numerology parameter. According to the embodiments of the present disclosure, the HARQ process ID may be associated with the numerology location of the transmission by using the configured information, so that the network side may determine the HARQ process ID used by the terminal device during the transmission once the network side determines that the received data is newly transmitted data, and further the network side may indicate the HARQ process ID in the uplink grant (UL grant) so as to perform a retransmission scheduling on the same data block, thereby improving the reliability of data retransmission.

In an optional embodiment, the acquiring the HARQ process ID used in the first time of transmission of the uplink grant-free transmission includes:

acquiring the HARQ process ID used in the first time of transmission of the uplink grant-free transmission by a second process calculation formula or a third process calculation formula, where the second process calculation formula is:

$$\text{Proc\_ID}=(\text{floor}(T_N/N\_\text{interval}/N\_\text{slot\_symbol\_per\_subframe}))\bmod \text{max\_proc\_num};$$

where the third process calculation formula is:

$$\text{Proc\_ID}=(\text{floor}(T_N/N\_\text{interval}))\bmod \text{max\_proc\_num};$$

where Proc_ID is the HARQ process ID, $T_N$ is the transmission location of the uplink grant-free transmission, N_interval is the transmission period, max_proc_num is the total number of HARQ processes available for the uplink grant-free transmission, and N_slot_symbol_per_subframe is the quantity of time slots or the quantity of symbols in each subframe.

In the embodiment of the present disclosure, the transmission location $T_N$ is obtained by using a third calculation formula, a fourth calculation formula, a fifth calculation formula, or a sixth calculation formula. When the terminal device acquires the transmission location of the uplink grant-free transmission by the third calculation formula, the fourth calculation formula, the fifth calculation formula, or the sixth calculation formula and based on the system frame number and/or the subframe number of the current configuration parameter, the offset N_start_offset in units of the quantity of time slots or the quantity of symbols, and transmission period N_interval in units of the quantity of subframes or the quantity of time slots or the quanity of symbol, the terminal device may acquire the HARQ process ID by the second process calculation formula or the third process calculation formula, and initiate the uplink grant-free transmission by the HARQ process corresponding to the HARQ process ID.

A method of configuring an uplink grant-free transmission is further provided in the embodiments of the present disclosure, including:

S300: indicating to a terminal device a configuration parameter for an uplink grant-free transmission;

where the configuration parameter includes one or more of:

a starting location, a subframe internal offset and a transmission period, where the starting location includes a starting location indicated by a system frame number and a subframe number or a starting location indicated by a subframe number.

The above method of configuring an uplink grant-free transmission is applied to a network side, and the execution entity is a network device.

Corresponding to the method of configuring an uplink grant-free transmission applied to the terminal side, before the terminal device sends the uplink grant-free data to the network side, the network side indicates the configuration parameter for the uplink grant-free transmission to the terminal device, to enable the terminal device to calculate the transmission location of the uplink grant-free transmission based on the configuration parameters indicated by the network device and/or combined with the default configuration parameters. For details about the configuration parameters may refer to the related description of the method on the terminal side, and details thereof are not described here.

In an optional embodiment, the indicating to the terminal device the configuration parameter for the uplink grant-free transmission further includes:

indicating to the terminal device a transmission period in a subframe for an uplink grant transmission, based on a channel parameter and a service requirement of the terminal device.

According to the embodiments of the present disclosure, the network side not only indicates the configuration parameter used for the uplink grant-free transmission to the terminal device, but also indicates the related parameter used for the uplink grant transmission, such as the transmission period in the subframe, etc., the transmission period in the subframe may still be a transmission period in units of time or a numerology transmission period in units of quantity of time slots or symbols. The uplink grant transmission may be used by the terminal device to retransmit the data block of the uplink grant-free transmission according to the indication of the network side. In an optional embodiment, the indicating to the terminal device the configuration parameter for the uplink grant-free transmission includes:

indicating explicitly to the terminal device the configuration parameter for the uplink grant-free transmission through a RRC signaling or a PDCCH signaling; and/or indicating implicitly to the terminal device the configuration parameter for the uplink grant-free transmission through a PDCCH signaling.

In the embodiment of the present disclosure, the network side may indicate the configuration parameters to the terminal device explicitly and/or implicitly, which may refer to the descriptions of the cases (2) and (3) in the related embodiments of the terminal side method, which is not described again herein.

The following takes an LTE base station as an example to illustrate that the network side explicitly indicates configuration parameters to the terminal device. Specifically, the base station determines configuration information of the uplink grant-free transmission for the terminal device according to performance indicators of the service, such as delay, data size and reliability. For example, in the performance indicator of service 1, the delay requirement is 1 ms, that is, one data transmission of service 1 needs to be completed within 1 ms, and the length of one subframe of the LTE system is 1 ms, and the base station may configure a transmission interval less than 1 ms for the terminal device performing the data transmission for service 1, such as x time slots or symbols, and x is less than the quantity of time slots or symbols in one subframe. For example, in the performance indicator of the service 2, the delay requirement is not sensitive, and the delay requirement is much longer than 1 ms, the base station may configure a larger transmission interval for the terminal device of the service 2, thereby reducing the resource waste.

In an optional embodiment, the method of configuring the uplink grant-free transmission at the network side further includes:

modifying one or more of the configuration parameters, and indicating the modified configuration parameters to the terminal device through a PDCCH signaling.

In the embodiment of the present disclosure, the network device may modify the configuration parameter that has been indicated to the terminal device, modify one of the configuration parameters, and then indicate the modified configuration parameter to the terminal device through the PDCCH signaling. In contrast, after receiving the new configuration parameter, the terminal device takes the new configuration parameter as the current configuration parameter, and reacquires the transmission location of the uplink grant-free transmission through Step S100.

In an optional embodiment, the indicating implicitly to the terminal device the configuration parameter for the uplink grant-free transmission through the PDCCH signaling includes:

indicating implicitly the starting location based on the system frame number and the subframe number corresponding to a receiving time of the PDCCH signaling; and/or indicating implicitly the subframe internal offset based on a time slot or a symbol corresponding to a time-frequency resource of the PDCCH signaling.

The configuration parameters implicitly indicated in the embodiment of the present disclosure include one or more of a system frame number, a subframe number, and an internal offset of the subframe. When the network side sends the PDCCH signaling to the terminal device, the terminal device may acquire the corresponding system frame number and the subframe number and take the same as the starting location based on the receiving time of the PDCCH signaling. The specific description of the starting location may refer to the related description of the terminal side method embodiment. Similarly, the terminal device may acquire a time offset or a numerology offset of the corresponding time slot or symbol and take the same as the subframe internal offset based on the time-frequency resource of the PDCCH signaling.

The embodiment of the disclosure further provides a terminal device, including a transmission location module and a transmission module;

the location acquisition module is configured to acquire a transmission location of an uplink grant-free transmission according to a current configuration parameter; and the transmission module is configured to acquire, according to the transmission location, a corresponding subframe time slot, and initiate the uplink grant-free transmission to a network side on the subframe time slot;

where the default configuration parameter or the configuration parameter includes one or more of:

a starting location, a subframe internal offset and a transmission period, where the starting location includes a starting location indicated by a system frame number and a subframe number or a starting location indicated by a subframe number.

The terminal device and the following optional embodiments of the present disclosure are corresponding to the terminal side method in the embodiment of the present disclosure. For details, refer to the related description of the terminal side method, and details are not described herein again.

Optionally, the current configuration parameter includes a default configuration parameter and/or a configuration parameter indicated by the network side.

Optionally, the transmission location module includes a calculation unit;

the calculation unit is configured to acquire a transmission location $T_N$ of an $N_{th}$ uplink grant-free transmission through the following calculation formula:

$$T_N = (\text{the starting location} + \text{the subframe internal offset} + \text{the transmission period} * N) \bmod \text{a system maximum configuration number},$$

where in the case that the starting location is indicated by the system frame number and the subframe number, the system maximum configuration number=a maximum system frame number*a quantity of subframes in each system frame; in the case that the starting location is indicated by the subframe number, the system maximum configuration number=a quantity of subframes in each system frame.

Optionally, the subframe internal offset includes an offset in units of time, or an offset in units of a quantity of time slots or a quantity of symbols;

the transmission period includes a transmission period in units of time, or a transmission period in units of a quantity of subframes or a quantity of time slots or a quantity of symbols.

Optionally, in the case that the subframe internal offset is the offset in units of time, the transmission period is the transmission period in units of time, to acquire a transmission time of the uplink grant-free transmission;

in the case that the subframe internal offset is the offset in units of the quantity of time slots or the quantity of symbols, the transmission period is the transmission period in units of the quantity of subframes or the quantity of time slots or the quantity of symbols, to acquire the transmission location of the uplink grant-free transmission, where the transmission location is a location of the subframe time slot.

Optionally, the calculation unit includes a first calculation unit, and the first calculation unit is configured to perform a first calculation formula which is based on the system frame number, the subframe number, an offset T_start_offset in units of time and a transmission period T_interval in units of time, and the first calculation formula is:

$$T_N = ((\text{subframe\_per\_SFN} * T\_SFN\_start + T\_subframe\_start) + T\_start\_offset + N * T\_interval) \bmod \text{max\_SFN} * \text{subframe\_per\_SFN},$$

where $T_N$ is the transmission time of the uplink grant-free transmission, and T_SFN_start is the system frame starting time, T_subframe_start is a subframe starting time, max_SFN is the maximum system frame number, and subframe_per_SFN is the quantity of subframes in each system frame.

Optionally, the calculation unit includes a second calculation unit, and the second calculation unit is configured to perform a second calculation formula which is based on the subframe number, an offset T_start_offset in units of time and a transmission period T_interval in units of time, and the second calculation formula is:

$$T_N = (T\_subframe\_start | T\_start\_offset | N * T\_interval) \bmod \text{subframe\_per\_SFN},$$

where $T_N$ is the transmission time of the uplink grant-free transmission, T_subframe_start is the subframe starting time, and subframe_per_SFN is the quantity of subframes in each system frame.

Optionally, the calculation unit includes a third calculation unit, and the third calculation unit is configured to perform a third calculation formula or a fourth calculation formula based on the system frame number, the subframe number, an offset N_start_offset in units of the quantity of time slots or the quantity of symbols and a transmission period N_interval in units of the quantity of subframes or the quantity of time slots or the quantity of symbols;

the third calculation formula is:

$$T_N = N\_slot\_symbol\_per\_subframe * (((\text{subframe\_per\_SFN} * N\_SFN\_start + N\_subframe\_start) + N\_start\_offset / N\_slot\_symbol\_per\_subframe + N * N\_interval) \bmod \text{max\_SFN} * \text{subframe\_per\_SFN});$$

the fourth calculation formula is:

$$T_N = N\_slot\_symbol\_per\_subframe * (((\text{subframe\_per\_SFN} * N\_SFN\_start + N\_subframe\_start) + (N\_start\_offset + N * N\_interval) / N\_slot\_symbol\_per\_subframe) \bmod \text{max\_SFN} * \text{subframe\_per\_SFN});$$

where $T_N$ is the transmission location of the uplink grant-free transmission, N_SFN_start is a system frame starting location, N_subframe_start is a subframe starting location, max_SFN is the maximum system frame number, subframe_per_SFN is the quantity of subframes in each system frame, and N_slot_symbol_per_subframe is the quantity of time slots or the quantity of symbols in each subframe.

Optionally, the calculation unit includes a fourth calculation unit, and the fourth calculation unit is configured to perform a fifth calculation formula or a sixth calculation formula based on the subframe number, an offset N_start_offset in units of the quantity of time slots or the quantity of symbols and a transmission period N_interval in units of the quantity of subframes or the quantity of time slots or the quantity of symbols;

the fifth calculation formula is:

$$T_N = N\_slot\_symbol\_per\_subframe * ((N\_subframe\_start | N\_start\_offset / N\_slot\_symbol\_per\_subframe + N * N\_interval) \bmod \text{subframe\_per\_SFN});$$

the sixth calculation formula is:

$$T_N = N\_slot\_symbol\_per\_subframe * ((N\_subframe\_start + (N\_start\_offset + N * N\_interval) / N\_slot\_symbol\_per\_subframe) \bmod \text{subframe\_per\_SFN});$$

where $T_N$ is the transmission location of the uplink grant-free transmission, N_subframe_start is a subframe starting location, max_SFN is the maximum system frame number, subframe_per_SFN is the quantity of subframes in each system frame, and N_slot_symbol_per_subframe is the quantity of time slots or the quantity of symbols in each subframe.

Optionally, the transmission module is further configured to, in the case that the subframe time slot is configured through mini-slots with different lengths, initiate the uplink grant-free transmission to the network side on the mini-slot corresponding to the transmission location determined by the calculation formula.

Optionally, the transmission module is further configured to, in the case that the subframe time slot is configured through mini-slots with different lengths, send an uplink grant-free reference signal to the network side at the transmission time and in the mini-slot corresponding to the transmission location determined by the calculation formula, and send an uplink grant-free data to the network side on a remaining resource of the corresponding mini-slot.

Optionally, the transmission module is further configured to, in the case that the subframe time slot is configured through mini-slots with different lengths, the uplink grant-free transmission is initiated to the network side on a $k_{th}$ mini-slot after the mini-slot corresponding to the transmission location determined by the calculation formula, or the uplink grant-free transmission is initiated to the network side on a $k_{th}$ symbol after a symbol of the mini-slot corresponding to the transmission time determined by the calculation formula, where k is an integer greater than or equal to 1.

Optionally, the transmission module includes a first process sending unit, and the first process sending unit is configured to:

acquire a HARQ process ID used in a first time of transmission of the uplink grant-free transmission, based on the transmission location determined by the calculation formula, the transmission period in units of time and a total number of HARQ processes available for the uplink grant-free transmission;

initiate the uplink grant-free transmission to the network side on the subframe time slot, through a HARQ process corresponding to the HARQ process ID.

Optionally, the first process sending unit is further configured to:

acquire the HARQ process ID used in the first time of transmission of the uplink grant-free transmission by a first process calculation formula, where the first process calculation formula is:

Proc_ID=(floor($T_N$/T_interval)) mod max_proc_num;

where Proc_ID is the HARQ process ID, $T_N$ is the transmission location of the uplink grant-free transmission, T_interval is the transmission period, and max_proc_num is the total number of HARQ processes available for the uplink grant-free transmission.

Optionally, the transmission module includes a second process sending unit, and the second process sending unit is configured to:

acquire a HARQ process ID used in a first time of transmission of the uplink grant-free transmission, based on the transmission location determined by the calculation formula, the transmission period in units of the quantity of subframes or the quantity of time slots or the quantity of symbols, the quantity of time slots or symbols in each subframe and a total number of HARQ processes available for the uplink grant-free transmission;

initiate the uplink grant-free transmission to the network side on the subframe time slot, through a HARQ process corresponding to the HARQ process ID.

Optionally, the second process sending unit is further configured to:

acquiring a HARQ process ID used in a first time of transmission of the uplink grant-free transmission through a second calculation formula or a third calculation formula, where the second process calculation formula is:

Proc_ID=(floor($T_N$/N_interval/N_slot_symbol_per_subframe)) mod max_proc_num;

where the third process calculation formula is:

Proc_ID=(floor($T_N$/N_interval)) mod max_proc_num;

where Proc_ID is the HARQ process ID, $T_N$ is the transmission location of the uplink grant-free transmission, N_interval is the transmission period, and max_proc_num is the total number of HARQ processes available for the uplink grant-free transmission The embodiment of the disclosure further provides a network device, including an indication module;

the indication module is configured to indicate to a terminal device a configuration parameter for an uplink grant-free transmission;

where the configuration parameter includes one or more of:

a starting location, a subframe internal offset and a transmission period, where the starting location includes a starting location indicated by a system frame number and a subframe number or a starting location indicated by a subframe number.

The network device and the following optional embodiments of the present disclosure are corresponding to the network side method in the embodiment of the present disclosure, the details thereof may refer to the related description of the network side method, which is omitted herein.

Optionally, the indication module is further configured to:

indicate to the terminal device a transmission period in a subframe for an uplink grant transmission, based on a channel parameter and a service requirement of the terminal device.

Optionally, the indication module includes an explicit indication unit and an implicit indication unit.

The explicit indication unit is configured to indicate explicitly to the terminal device the configuration parameter for the uplink grant-free transmission through a RRC signaling or a PDCCH signaling.

The implicit indication unit is configured to indicate implicitly to the terminal device the configuration parameter for the uplink grant-free transmission through a PDCCH signaling.

Optionally, the network device further includes a modification module configured to:

modify one or more of the configuration parameters, and indicating the modified configuration parameters to the terminal device through a PDCCH signaling.

Optionally, the implicit indication unit is configured to:

indicate implicitly the starting location based on the system frame number and the subframe number corresponding to a receiving time of the PDCCH signaling; and/or indicate implicitly the subframe internal offset based on a time slot or a symbol corresponding to a time-frequency resource of the PDCCH signaling.

The embodiment of the present disclosure further provides a system, including the terminal device according to any one of the foregoing embodiments, or the terminal device according to any one of the embodiments of the terminal device, and the foregoing network device or a network device according to any of the embodiments of the network device.

According to the system in the embodiments of the present disclosure, by using the network device and the terminal device and based on the starting location of the configuration parameter, subframe internal offset and the transmission period, the transmission location of the uplink grant-free transmission is acquired, thereby flexibly adapting to different Numerology or different time granularities in the current system, supporting different Numerology and/or shorter scheduling time granularity configurations in the NR system and overcoming the shortcomings of the related art.

An embodiment of the present disclosure further provides a terminal device, including a processor, a memory, a computer program stored on the memory and executable by the processor, and the computer program is executed by the processor to implement the foregoing method of configuring an uplink grant-free transmission at the terminal side and the processes of the various embodiments, and the same technical effects can be achieved. To avoid repetition, details are not described herein again.

The embodiment of the present disclosure further provides a computer-readable storage medium, where the computer-readable storage medium stores a computer program, and the computer program is executed by the processor to implement the terminal side method of configuring the uplink grant-free transmission and the process of each of the embodiments, and can achieve the same technical effect. To avoid repetition, details are not described herein again. The computer-readable storage medium, such as a read-only memory (ROM), a random access memory (RAM), a magnetic disk, or an optical disk.

The embodiment of the present disclosure further provides a network device, including a processor, a memory, a computer program stored on the memory and executable on the processor, and the computer program is executed by the processor to implement the foregoing method of configuring an uplink grant-free transmission at the network side and the processes of the various embodiments, and the same technical effects can be achieved. To avoid repetition, details are not described herein again.

The embodiment of the present disclosure further provides a computer-readable storage medium, where the computer-readable storage medium stores a computer program, and the computer program is executed by the processor to implement the network side method of configuring the uplink grant-free transmission and the process of each of the embodiments, and can achieve the same technical effect. To avoid repetition, details are not described herein again. The computer-readable storage medium, such as a read-only memory (ROM), a random access memory (RAM), a magnetic disk, or an optical disk.

Those of ordinary skill in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the solution. A person skilled in the art can use different methods for implementing the described functions for each particular application, but such implementation should not be considered to be beyond the scope of the present disclosure.

A person skilled in the art can clearly understand that for the convenience and brevity of the description, the specific working process of the system, the device and the unit described above can refer to the corresponding process in the foregoing method embodiment, and details are not described herein again.

In the embodiments provided by the present application, it should be understood that the disclosed apparatus and method may be implemented in other manners. For example, the device embodiments described above are merely illustrative. For example, the division of the unit is only a logical function division. In actual implementation, there may be another division manner, for example, multiple units or components may be combined or can be integrated into another system, or some features can be ignored or not executed. In addition, the mutual coupling or direct coupling or communication connection shown or discussed may be an indirect coupling or communication connection through some interface, device or unit, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the objectives of the embodiments of the present disclosure.

In addition, each functional unit in each embodiment of the terminal device and the network device of the present disclosure may be integrated into one processing unit, or each unit may exist physically separately, or may be integrated by two or more units. In one unit.

The functions may be stored in a computer-readable storage medium if implemented in the form of a software functional unit and sold or used as a standalone product. Based on such understanding, the technical solution of the present disclosure, which is essential or contributes to the prior art, or a part of the technical solution, may be embodied in the form of a software product, which is stored in a storage medium, including The instructions are used to cause a computer device (which may be a personal computer, server, or network device, etc.) to perform all or part of the steps of the methods described in various embodiments of the present disclosure. The foregoing storage medium includes various media that can store program codes, such as a USB flash drive, a mobile hard disk, a ROM, a RAM, a magnetic disk, or an optical disk.

The above are only some embodiments of the present disclosure, and it should be noted that those skilled in the art may also make several improvements and refinements without departing from the principles of the present disclosure, which should be considered as the scope of the present disclosure.

What is claimed is:

1. A method of configuring an uplink grant-free transmission, comprising:

acquiring a transmission location of an uplink grant-free transmission according to a current configuration parameter;

acquiring, according to the transmission location, a corresponding subframe time slot, and initiating the uplink grant-free transmission to a network side on the subframe time slot;

wherein the current configuration parameter comprises one or more of: a starting location, a subframe internal offset and a transmission period, wherein the starting location comprises a starting location indicated by a system frame number and a subframe number or a starting location indicated by a subframe number;

wherein the acquiring the transmission location of the uplink grant-free transmission according to the current configuration parameter comprises:

acquiring a transmission location $T_N$ of $N_{th}$ uplink grant-free transmission through the following calculation formula:

$$T_N = [(N\_SNF\_start*subframe\_per\_SFN*N\_slot\_symbol\_per\_subframe+$$
$$N\_subframe\_start*N\_slot\_symbol\_per\_subframe+$$
$$N\_start\_offset)+N*N\_interval]mod$$
$$(max\_SFN*subframe\_per\_SFN*N\_slot\_symbol\_per\_subframe);$$

wherein N_SFN_start is a system frame starting location, N_subframe_start is a subframe starting location, max_SFN is the maximum system frame number, subframe_per_SFN is the quantity of subframes in each system frame, N_slot_symbol_per_subframe is the quantity of time slots or the quantity of symbols in each subframe, N_start_offset is an offset in units of the quantity of time slots or the quantity of symbols, and N_interval is a transmission period in units of the quantity of subframes or the quantity of time slots or the quantity of symbols.

2. The method according to claim 1, wherein the current configuration parameter comprises a default configuration parameter and/or a configuration parameter indicated by the network side.

3. The method according to claim 1, wherein the initiating the uplink grant-free transmission to the network side on the subframe time slot comprises:

acquiring a HARQ process ID used in a first time of transmission of the uplink grant-free transmission, based on the transmission location determined by the calculation formula, the transmission period in units of the quantity of subframes or the quantity of time slots or the quantity of symbols, the quantity of time slots or symbols in each subframe and a total number of HARQ processes available for the uplink grant-free transmission;

initiating the uplink grant-free transmission to the network side on the subframe time slot, through a HARQ process corresponding to the HARQ process ID.

4. The method according to claim 1, further comprising: acquiring a HARQ process ID used in a first time of transmission of the uplink grant-free transmission, wherein a calculation formula of the HARQ process ID is:

$$Proc\_ID=(floor(T_N/N\_interval)) \bmod max\_proc\_num;$$

wherein Proc_ID is the HARQ process ID, $T_N$ is the transmission location of the uplink grant-free transmission, N_interval is the transmission period, and max_proc_num is the total number of HARQ processes available for the uplink grant-free transmission.

5. A method of configuring an uplink grant-free transmission, comprising:

indicating to a terminal device a configuration parameter for an uplink grant-free transmission;

wherein the configuration parameter comprises one or more of: a starting location, a subframe internal offset and a transmission period, wherein the starting location comprises a starting location indicated by a system frame number and a subframe number or a starting location indicated by a subframe number, wherein the configuration parameter comprises for the uplink grant-free transmission is configured to enable the terminal device to acquire a transmission location $T_N$ of $N_{th}$ uplink grant-free transmission through the following calculation formula:

$$T_N = [(N\_SNF\_start*subframe\_per\_SFN*N\_slot\_symbol\_per\_subframe+$$
$$N\_subframe\_start*N\_slot\_symbol\_per\_subframe+$$
$$N\_start\_offset)+N*N\_interval]mod$$
$$(max\_SFN*subframe\_per\_SFN*N\_slot\_symbol\_per\_subframe);$$

wherein N_SFN_start is a system frame starting location, N_subframe_start is a subframe starting location, max_SFN is the maximum system frame number, subframe_per_SFN is the quantity of subframes in each system frame, N_slot_symbol_per_subframe is the quantity of time slots or the quantity of symbols in each subframe, N_start_offset is an offset in units of the quantity of time slots or the quantity of symbols, and N_interval is a transmission period in units of the quantity of subframes or the quantity of time slots or the quantity of symbols.

6. The method according to claim 5, wherein the indicating to the terminal device the configuration parameter for the uplink grant-free transmission further comprises:

indicating to the terminal device a transmission period in a subframe for an uplink grant transmission, based on a channel parameter and a service requirement of the terminal device;

or, the indicating to the terminal device the configuration parameter for the uplink grant-free transmission comprises:

indicating explicitly to the terminal device the configuration parameter for the uplink grant-free transmission through a RRC signaling or a PDCCH signaling; and/or indicating implicitly to the terminal device the configuration parameter for the uplink grant-free transmission through a PDCCH signaling;

or, the method further comprises: modifying one or more of the configuration parameters, and indicating the modified configuration parameters to the terminal device through a PDCCH signaling;

or, the indicating implicitly to the terminal device the configuration parameter for the uplink grant-free transmission through the PDCCH signaling comprises:

indicating implicitly the starting location based on the system frame number and the subframe number corresponding to a receiving time of the PDCCH signaling; and/or indicating implicitly the subframe internal offset based on a time slot or a symbol corresponding to a time-frequency resource of the PDCCH signaling.

7. A terminal device, comprising: at least one processor and at least one memory coupled to the processor to communicate with the processor, wherein the memory stores program instructions executable by the processor, the processor calls the program instructions to:

acquire a transmission location of an uplink grant-free transmission according to a current configuration parameter; and acquire, according to the transmission location, a corresponding subframe time slot, and initiate the uplink grant-free transmission to a network side on the subframe time slot;

wherein the current configuration parameter comprises one or more of: a starting location, a subframe internal offset and a transmission period, wherein the starting location comprises a starting location indicated by a system frame number and a subframe number or a starting location indicated by a subframe number;

wherein the processor calls the program instructions to acquire transmission location $T_N$ of an $N_{th}$ uplink grant-free transmission through the following calculation formula:

$$T_N = [(N\_SNF\_start * subframe\_per\_SFN * N\_slot\_symbol\_per\_subframe + N\_subframe\_start * N\_slot\_symbol\_per\_subframe + N\_start\_offset) + N * N\_interval] \bmod (max\_SFN * subframe\_per\_SFN * N\_slot\_symbol\_per\_subframe);$$

wherein N_SFN_start is a system frame starting location, N_subframe_start is a subframe starting location, max_SFN is the maximum system frame number, subframe_per_SFN is the quantity of subframes in each system frame, N_slot_symbol_per_subframe is the quantity of time slots or the quantity of symbols in each subframe, N_start_offset is an offset in units of the quantity of time slots or the quantity of symbols, and N_interval is a transmission period in units of the quantity of subframes or the quantity of time slots or the quantity of symbols.

8. A network device, comprising: at least one processor and at least one memory coupled to the processor to communicate with the processor, wherein the memory stores program instructions executable by the processor, the processor calls the program instructions to perform the method according to claim 5.

\* \* \* \* \*